(12) United States Patent
Bramani et al.

(10) Patent No.: US 12,364,313 B2
(45) Date of Patent: Jul. 22, 2025

(54) TRACTION LUG FOR FOOTWEAR

(71) Applicant: VIBRAM S.P.A., Albizzate (IT)

(72) Inventors: Marco Bramani, Milan (IT); Steven Ellis, Baldwinville, MA (US); David Filar, Worcester, MA (US); Sophia Luo, Guangdong (CN); Tony Gin, Guangdong (CN)

(73) Assignee: VIBRAM S.P.A., Albizzate (IT)

( * ) Notice: Subject to any disclaimer, the term of this patent is extended or adjusted under 35 U.S.C. 154(b) by 389 days.

(21) Appl. No.: 17/611,455

(22) PCT Filed: Dec. 23, 2019

(86) PCT No.: PCT/IB2019/061293
§ 371 (c)(1),
(2) Date: Nov. 15, 2021

(87) PCT Pub. No.: WO2020/229888
PCT Pub. Date: Nov. 19, 2020

(65) Prior Publication Data
US 2023/0346081 A1    Nov. 2, 2023

(30) Foreign Application Priority Data

May 14, 2019    (IT) .......................... 102019000006827

(51) Int. Cl.
*A43C 15/16* (2006.01)
*A43B 13/22* (2006.01)
*A43B 13/26* (2006.01)

(52) U.S. Cl.
CPC .......... *A43C 15/162* (2013.01); *A43B 13/223* (2013.01); *A43C 15/16* (2013.01); *A43B 13/26* (2013.01)

(58) Field of Classification Search
CPC ..... A43C 15/16; A43C 15/162; A43B 13/223; A43B 13/26; A43B 15/18; A43B 15/161;
(Continued)

(56) References Cited

U.S. PATENT DOCUMENTS 3,413,737 A * 12/1968 Kneebusch ............ A43C 15/18
36/134
3,898,751 A *  8/1975 Gustin ................. A43C 15/167
36/67 D (Continued)

FOREIGN PATENT DOCUMENTS

| BE | 466369 A | 8/1946 |
| DE | 1825444 U | 1/1961 |
| EP | 1557104 A1 | 7/2005 |

OTHER PUBLICATIONS

International Search Report for PCT/IB2019/061293 dated Jun. 24, 2020 (8 pages).
(Continued)

*Primary Examiner* — Khoa D Huynh
*Assistant Examiner* — Giao Q T Hoang
(74) *Attorney, Agent, or Firm* — Tutunjian & Bitetto, P.C.

(57) ABSTRACT

A lug for a sole or outsole of a footwear, i.e. a shoe or a boot, which is able to improve the traction or grip features of the sole itself; sole or outsole equipped with a plurality of lugs and a method for obtaining a mold cast printed with a 3D printing machine to obtain the sole and/or the lugs.

12 Claims, 8 Drawing Sheets

(58) Field of Classification Search
CPC ... A43B 15/162; A43B 15/164; A43B 15/165; A43B 15/168
See application file for complete search history.

(56) References Cited

U.S. PATENT DOCUMENTS

| | | | | |
|---|---|---|---|---|
| 4,098,011 | A | * | 7/1978 | Bowerman .............. A43B 5/06 36/129 |
| 4,233,759 | A | | 11/1980 | Bente |
| 4,309,831 | A | | 1/1982 | Pritt |
| D290,781 | S | * | 7/1987 | Grubel ........................... D2/955 |
| 6,342,544 | B1 | * | 1/2002 | Krstic ...................... A43B 5/02 523/167 |
| 2005/0081405 | A1 | | 4/2005 | Healy |
| 2007/0283595 | A1 | | 12/2007 | Bright |
| 2014/0026441 | A1 | | 1/2014 | Stauffer |
| 2016/0198793 | A1 | | 7/2016 | Dombrow |

OTHER PUBLICATIONS

Written Opinion of ISA for PCT/IB2019/061293 dated Nov. 19, 2020 ( 11 pages).
Written Opinion of IPEA for PCT/IB2019/061293 dated Apr. 15, 2021 ( 12 pages).
IPRP Chapter II for PCT/IB2019/061293 dated Aug. 6, 2021 ( 21 pages).

* cited by examiner

TRACTION LUG FOR FOOTWEAR

TECHNICAL FIELD OF INVENTION

The present invention relates to a lug for a sole or outsole of a footwear, i.e. a shoe, a sport shoe or a boot. In particular, the present invention relates to a lug showing improved traction or grip features.

The present invention relates also to a sole or outsole equipped with at least one and/or a plurality of lugs according to the present invention.

Furthermore, such lugs are obtained with a mold made by casting around a 3D printed part.

DESCRIPTION OF RELATED ART

The technique of three-dimensional printing, also known as "additive manufacturing", is experiencing a great development in last years. In general, with this technique it is possible to produce a three-dimensional object, also with complex structures, starting from a three-dimensional "file" generated by appropriate software and arriving to the production, for example by means of successive layers, of a complete three-dimensional object.

This construction technique allows the production of structures of any geometric complexity, by the addition of a material which has the needed or desired characteristics. This simultaneously allows an elevated freedom of design/construction and the possibility of reducing waste material.

In the footwear sector, more particularly in the field of sport, running, outdoor, or work and safety footwear, the problem to have a product that is well suited to the different features of the foot and of the movement of the user, in relation to the specific activity to be performed, is particularly felt.

In particular, an always greater need, in the footwear sector, is that to have a sole or outsole with improved grip and traction, also on sliding or slippery or granular grounds.

The most common technique to produce soles or outsoles of footwear is that of traditional molding of elastomeric material.

Further, to date, a sole is produced by molding, gluing or combining different components such as tread, midsole of different density, and any further elements, such as lugs or cleats. Such different components, previously obtained in specific molds, are then assembled by gluing or co-molding, thus requiring a large number of involved machines.

The patent application US2016/198793A discloses a running shoe which includes an upper coupled to a sole structure. The sole structure includes a compressible midsole and an outsole. The outer surface of the outsole includes a series of treads or traction elements extending along the bottom and sides of the outsole. With this configuration, when the sole structure contacts an uneven surface, the outsole conforms around it, stabilizing the footwear during use.

The patent application US2005/081405A1 discloses a shoe outsole containing articulated lugs of various shapes extending downward from the base of the outsole and adapted for contacting the ground and enhancing traction.

The patent application US2007/283595A1 discloses a sole for footwear with a plurality of xshaped pillars, preferably made of rubber or other elastomer. The x-shaped pillars are vertical columns in the cross-sectional shape of an "X" having a wider base towards the inside of the footwear and extending, preferable in steps, to a narrower cross-section at the walking surface.

The patent application US2014/026441A1 discloses a footwear, especially football shoes, which includes a sole structure including a sole component and at least a first ground engaging member extending substantially downward from the bottom surface of the sole and having a substantially circular cross-sectional shape. In addition, the sole structure may also include a tapered support structure which has a substantially pyramidal shape and partially surrounds the first ground engaging member such that a portion of the first ground engaging member is exposed between edges of the tapered support structure.

The patent application U.S. Pat. No. 3,413,737A discloses a cleat for a football shoe comprising a base portion for attachment to the sole and a generally frusto-conical portion unitary with the base portion and converging downwardly therefrom. The surface of the generally frusto-conical portion has a plurality of serrations encircling the periphery of such generally frusto-conical portion. Furthermore, notches or grooves are present, which are spaced circumferentially around an edge of the generally frusto-conical portion.

There is therefore a need to produce a sole or outsole for footwear, and in particular, a lug for a sole or outsole, able to respond to the above requirements, while allowing a high traction while performing athletic activity, for example walking or running or the like, for which they are provided.

SUMMARY OF THE INVENTION

The main aim, therefore, of the present invention is to improve the state of the art in the field of soles or outsoles for footwear through the production of at least a lug that has the ability to improve grip or traction also on terrains consisting of granular particulates or penetrable surfaces.

Another advantage of the present invention is that to provide a lug that is customizable and/or customized on the base of specific data and needs as a result of previous measurements.

Yet another objective of this invention is that to provide a sole or outsole for footwear equipped with a plurality of lugs for improving grip or traction also on terrains consisting of granular particulates or penetrable surfaces.

A further aim of the present invention is to provide a mold for a sole or outsole and/or for at least one lug for a sole or outsole for footwear that is fast and easy to produce at competitive costs.

According to a first aspect of the present invention, a lug for a sole or outsole of a footwear, i.e., a sport shoe, a shoe or a boot, is provided according to the present application.

According to a further aspect of the present invention, a sole or outsole comprising at least a lug is provided according to the present application.

A further objective of the present invention is moreover that of providing a method for obtaining a mold for producing a sole or outsole and/or at least one lug according to the present invention and a method for obtaining such sole or outsole.

Further advantages or preferred characteristics of the invention are described in the present application.

BRIEF DESCRIPTION OF THE DRAWINGS

Other features and advantages of the present invention will be more apparent from the description of an embodiment of a lug for a sole or outsole for footwear, illustrated by way of example and not limited to the accompanying drawings, in which.

DETAILED DESCRIPTION OF THE INVENTION

Figure 1:
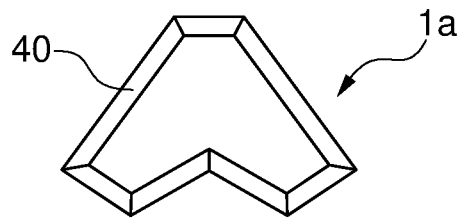
FIG. 1 is a perspective view of one version of a lug for a sole or outsole of footwear used as control lug during test.

With reference to the attached figures, the reference number 1 generally indicates a lug for a sole or outsole of a footwear, i.e. shoe a sport shoe or a boot or an outdoor shoe or a work or safety footwear, according to the present invention.

The at least one lug 1 and/or the plurality of lugs 1 of the present invention are disposed on the bottom of the sole creating the treat of the sole or outsole.

The lug 1 and the sole and/or outsole equipped with a plurality of lugs 1 according to the present invention have an improved grip or traction on terrains consisting of granular particulates or penetrable surfaces such as sand, gravel, mulch, dirt, snow, etc.

Therefore, thanks to the lugs of the present invention, the sole or outsole is able to provide stability to the user, according to the athletic activity or movement that the user intends to perform wearing the specific footwear equipped with such sole or outsole.

In the following specification, the word "sole" can be used alone, always meaning sole or outsole of a footwear.

Furthermore, with "low" or "lower" it is meant an object or component facing or positioned toward the support surface or the ground, with "upper" or "higher" it is meant an object or component facing or positioned toward the user, with "lateral" it is meant an object or component facing or positioned medially or laterally relative to the user's foot.

Further, with "front" or "frontal" it is meant an object or component facing or placed in correspondence with the toes of the foot of a user while with "rear" or "posterior" it is meant an object or component facing or placed in correspondence with the heel of the foot of a user.

The sole according to the present invention presents a thickness and an extension, according to a top plan view, substantially corresponding to that of the soles of the traditional type or slightly greater than that of the user's foot. The sole according to the present invention comprises an upper surface 10, adapted in use to face toward the foot of a user, and a lower surface 20, adapted in use to face toward the resting surface or the ground.

The upper surface 10 may be suitable to contact an upper and/or an inner sole or midsole.

The lower surface 20 is equipped with at least one and/or a plurality of lugs 1 according to the present invention.

In particular, in at least one version of the present invention, the lower surface 20 is directly attached, for example by means of a unique molding step, with the at least one lug 1.

The lug 1 comprises a first base 2, a second base 3 and a sidewall 4.

In particular, the first base 2 is lower in use, i.e. it is suitable to contact the ground while the second base 3 is upper in use, i.e. it is stably attached to the lower surface 20 of the sole.

The second base 3 is opposite to the first base 2 and the sidewall 4 connects laterally the first base 2 and the second base 3 and/or the lower surface 20 of the sole.

One peculiarity of the present invention is that the sidewall 4 of the present invention has lateral features and/or elements on it, which are very small (compared to the entire sidewall 4 of the lug) and obtained as better explained below. These lateral features and/or elements are able to confer to the lug 1 and/or to the sole a better traction than compared to lugs with smooth sidewall (as the sidewall 40 shown in FIGS. 1 and 8A-8C).

In fact, such lateral features and/or elements increase significantly the surface area of the sidewall 4, thus conferring better traction and/or grip, on terrains consisting of granular particulates or penetrable surfaces.

In a version of the invention, the features and/or elements are present also at the first base 2, increasing the surface area of the first base 2.

The thickness of the sole can be variable. For example, the thickness of the sole at the part in use in the front of the sole can be smaller than the thickness of the sole at the part in use in the rear of the sole.

In the same way, the height (i.e. the distance between the first base 2 and the second base 3) of the lugs can be variable along the sole or also between the front part of the lug and its rear part. For example, the height of the lug/s 1 can be smaller at the part in use in the front of the sole while it can be greater at the part in use in the rear of the sole.

In another version of the invention, the thickness of the sole and/or the height of the lugs 1 can be the same both at the front and at the rear part of the sole itself. According to a specific version of the present invention, for example shown in the attached figures, the lug 1 has a V-like shape in top plan view. In such a case, the first base 2 and said second base 3 have a V-like shape in top plan view.

However, the lug 1 can have also a different shape, such as in general a substantially prismatic, cubic, parallelepiped, frustum of cone or frustum of pyramid, regular, irregular, L-like, C-like shape, and so on. In this case, the first base 2 and the second base 3 have a square, rectangular, polygonal, parallelogram, regular, irregular, L-like, C-like shape, cylindrical, organic, hemispherical, tetrahedral, semi-ellipsoidal, or trapezoidal, etc.

In a particular embodiment of the invention, as shown in the attached figures, the first base 2 is smaller in size than the second base 3. According to this, the sidewall 4 is inclined and/or tapered, for example towards a common point. Therefore, the faces constituting the sidewall 4 of the lug are inclined along directions converging towards the ground.

In another version of the invention, the first base 2 and the second base 3 can have the same size, but they can be offset the one with the other. According to this, the sidewall 4 is still inclined. In this way, however, all the faces constituting the sidewall of the lug 1 are inclined along the same direction. This direction is the direction of offset of the first 2 and second base 3.

Figure 2A:
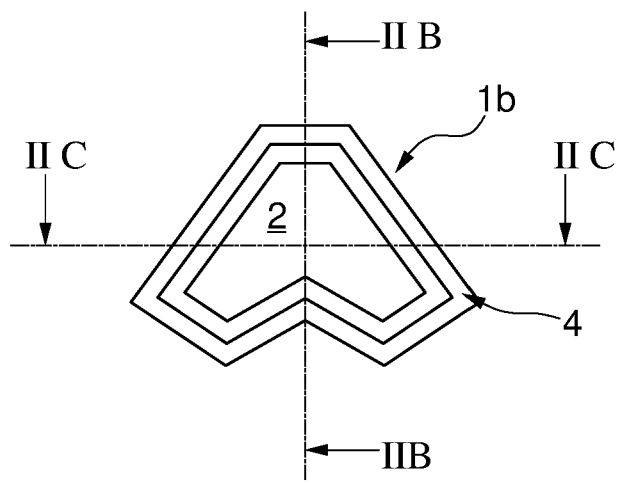
FIGS. 2A-2C show in top plan view, together with its longitudinal and transversal sections (the longitudinal direction goes from toes to heel of a respective sole or outsole while the transversal direction goes from side to side) of another version of a lug for a sole or outsole of footwear used as control lug during test.
Figure 2B:
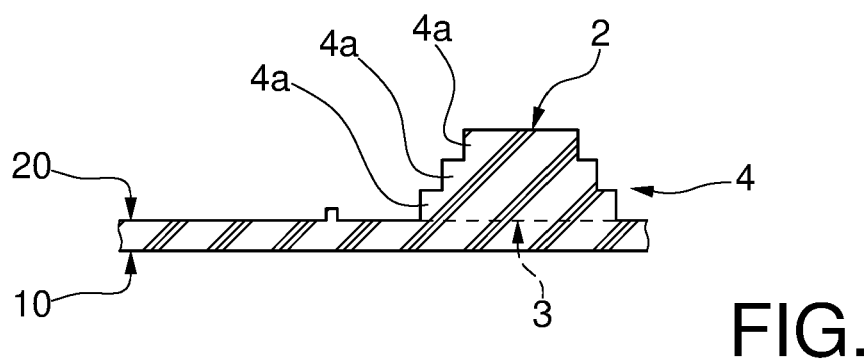
Figure 2C:
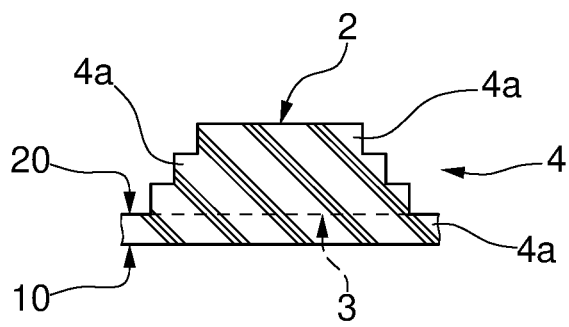

In an example shown in FIGS. 2A-2C, the sidewall 4 of the lug 1b is stepwise. This can be a test control lug or the base-shape for the lugs of the present invention. In this example, the sidewall 4 comprises at least one step 4a or at least two steps 4a, three in the illustrated version.

Each step 4a has substantially the same size and/or it has sharped or rounded edges and/or it has right-angled edges.

In a version of the invention, the sidewall 4 and/or the step 4a has a plurality of protrusions 4b, for example lateral protrusions 4b.

With the stepped lug, it is possible to have more features and/or elements. In any case, it is not necessary that the lug 1 has a stepped structure.

Figure 3A:
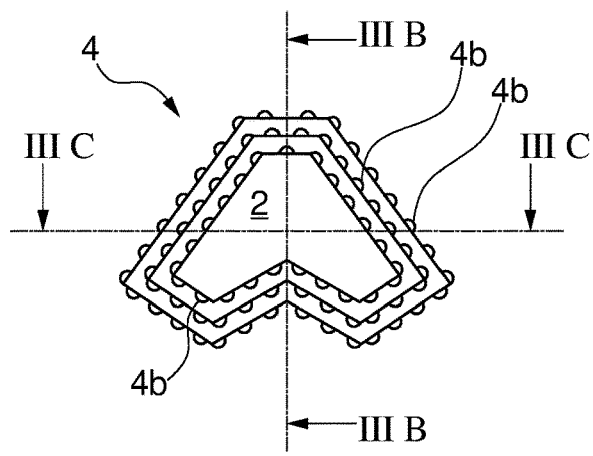
FIGS. 3A-3C show in top plan view a version of a lug for a sole or outsole of footwear according to the present invention, together with its longitudinal and transversal sections (the longitudinal direction goes from toes to heel of a respective sole or outsole while the transversal direction goes from side to side)
Figure 3B:
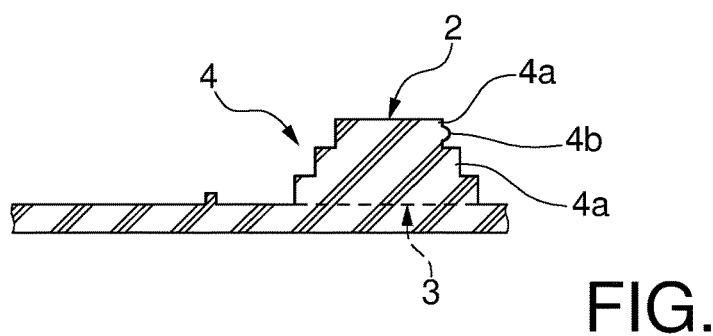
Figure 3C:
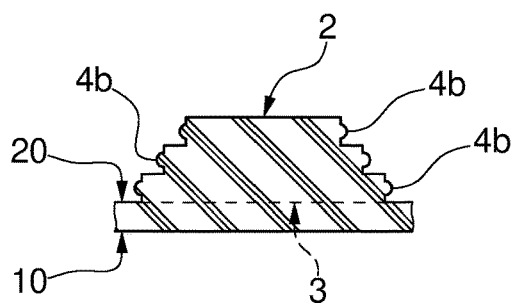

In the FIGS. 3A-3C, such lateral protrusions 4b have a protruding shape and a base, wherein the protruding shape is a substantially semispherical shape. The base of each protrusion 4b is attached to the sidewall 4 and/or on the vertical side (i.e. the side extending substantially along a direction going from the foot to the ground) of the step 4a.

The lateral protrusions 4b can have the protruding shape as a faceted semi sphere. Otherwise, the protruding shape of the protrusions 4b can have a pyramidal, frustum of pyramid, frustum of cone, conical, or prismatic shape and so on.

According to another version, the lateral protrusions 4b can also be present on the first base 2 of the lug 1 and/or on the horizontal sides of the steps 4a.

Figure 4A:
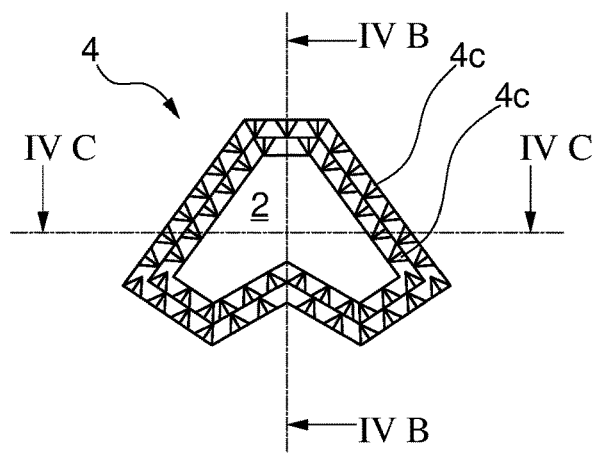
FIGS. 4A-4C show in top plan view another version of a lug for a sole or outsole of footwear according to the present invention, together with its longitudinal and transversal sections (the longitudinal direction goes from toes to heel of a respective sole or outsole while the transversal direction goes from side to side)
Figure 4B:
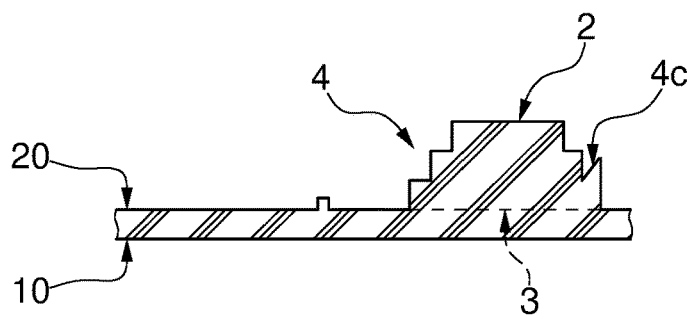
Figure 4C:
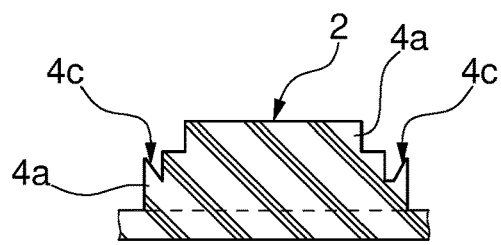

In a second version of the invention, for example shown in FIGS. 4A-4C, the sidewall 4 of the lug 1 is stepwise. In this version too, the sidewall 4 comprises several steps 4a, three in the illustrated version.

Each step 4a has substantially the same features as disclosed for the previous versions.

In such a version of the invention, the sidewall 4 and/or the step 4a comprises a plurality of indentations 4c. Each indentation 4c comprises an intruding shape and a base, wherein the base is placed at the sidewall 4 and/or at the step 4a. The intruding shape can have a substantially semispherical shape or a faceted semi-sphere, or pyramidal, frustum of pyramid, frustum of cone, conical, or prismatic shape.

In the figures, the indentations 4c have a spike or pyramidal or diamond shape. In a version of the invention, the indentations 4c have a semispherical shape while the lateral protrusions 4b have a pyramidal or diamond shape, a parallelepiped or rectangular prism, or any further suitable shape.

As shown in FIG. 4C, the base of each indentation 4c is placed at the horizontal side of the step 4a, extending inside the step 4a and/or the sidewall 4, along a substantially vertical direction. The apex of the indentation 4c is inside the lug 1.

In this case too, the indentations 4c could be placed at the first base 2 of the lug 1 and/or on the vertical sides of the steps 4a.

In this particular version, the presence of the indentation 4c can create, in at least one step 4a, the fact that it has no more a right-angled edge: it acquires a spike edge, with a sort of tip or sharped edge at the top portion thereof.

Figure 5:
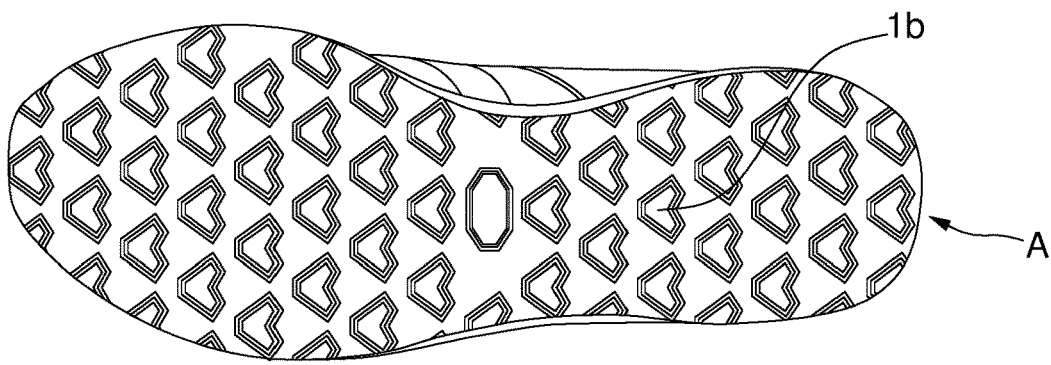
FIG. 5 is a bottom view of a sole with a plurality of lugs of FIGS. 2A-2C for test control.
Figure 6:
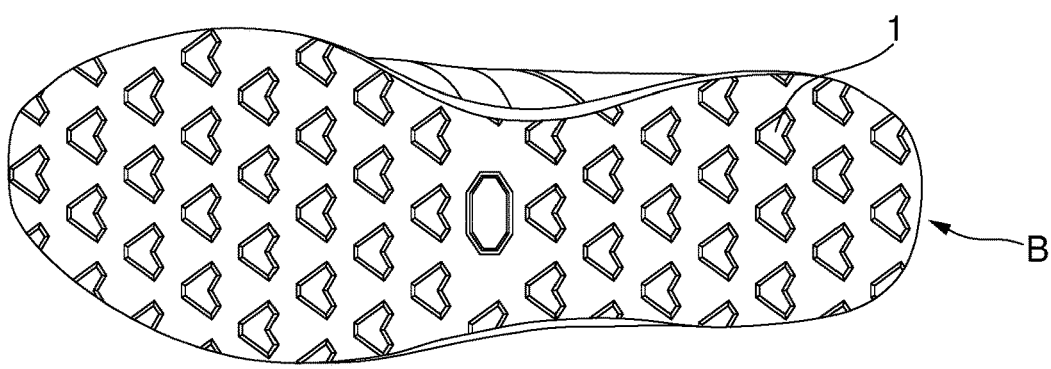
FIG. 6 is a bottom view of a sole with a plurality of lugs of FIGS. 9A-9C.
Figure 7:
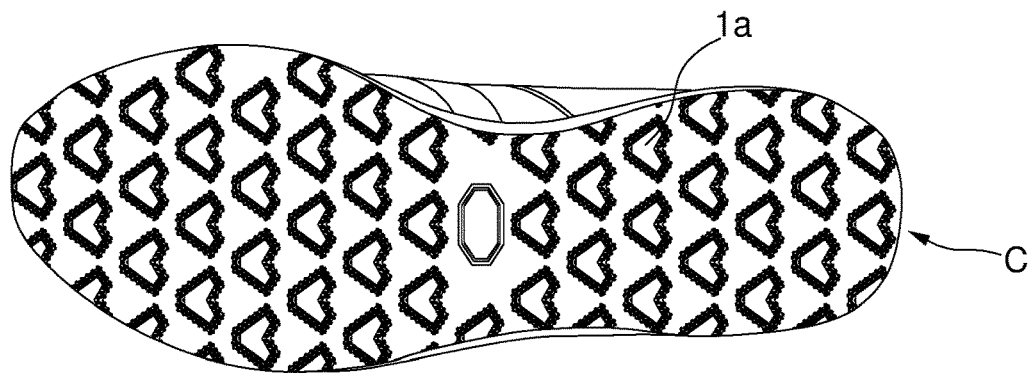
FIG. 7 is a bottom view of a sole with a plurality of lugs of FIG. 1 for test control.
Figure 8A:
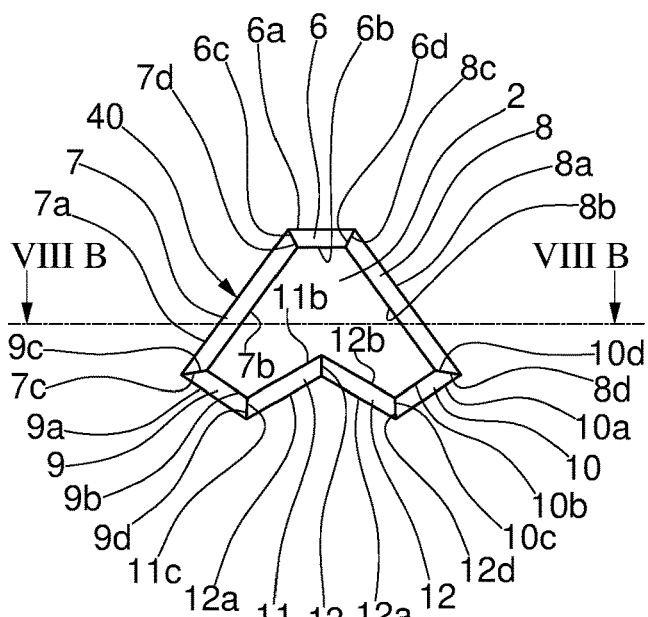
FIGS. 8A-8C show in top plan view the lug of FIG. 1, together with its transversal and longitudinal sections (the longitudinal direction goes from toes to heel of a respective sole or outsole while the transversal direction goes from side to side)

FIG. 5 shows a sole or outsole A equipped with a plurality of lugs 1b, according to the version shown in FIG. 2A; FIG. 6 shows a sole or outsole B equipped with a plurality of lugs 1, according to the version shown in FIG. 9A; FIG. 7 shows a sole or outsole C equipped with a plurality of lugs 1a, according to the version shown in FIG. 1.

In FIGS. 1 and 8A-8C, it is disclosed the structure of the lug 1a which has a substantially V-like shape in top plan view.

Such structure can be applied also to the lug 1, when it has a V-like shape.

In such lug 1a—as disclosed before for the lug 1—we can identify a first base 2 smaller than a second base 3, the latter being attached to the lower surface 20 of the sole. As the first base 2 is parallel to the second base 3, and centrally symmetrically placed with respect to the second base 3, the sidewall 4 of the lug is uniformly inclined towards the inner of the lug itself.

Looking from the front to the rear or heel of the sole, the sidewall 4, 40 of each lug 1, 4a comprises a first front face 6 which base sides 6a, 6b, the base sides 6a, 6b have a transverse extension with respect to the sole.

The base sides 6a, 6b are parallel one with respect to the other but the top base side 6b (suitable to be in contact with the ground) is smaller than the bottom side base 6a (attached to the lower surface 20 of the sole). The base sides 6a, 6b are connected by two sides 6c (left), 6d (right) of the same size and opposite inclination, i.e. they are inclined towards the smaller base 6b.

The front face 6 has therefore a trapezoidal shape.

Two main side faces 7 and 8 depart from the first front face 6, respectively on the left and on the right of the first front face 6.

Each main side face 7, 8 has the same shape, i.e. a trapezoidal shape.

Their extension is towards the bottom of the sole and respectively towards each side of the sole (the left main side face 7 is directed towards the outer side of the sole while the right main side face 8 is directed towards the inner side of the sole).

Each main side face 7, 8, has respectively base sides 7a, 7b, 8a, 8b parallel one with respect to the other with the top base sides 7b, 8b (suitable to be in contact with the ground) smaller than the bottom base sides 7a, 8a (attached to the lower surface 20 of the sole). The base sides 7a, 7b are connected by two sides 7c (left), 7d (right) of the same size and opposite inclination, i.e. they are inclined towards the smaller base side 7b. The side 7d coincides with the side 6c.

The base sides 8a, 8b are connected by two sides 8c (left), 8d (right) of the same size and opposite inclination, i.e. they are inclined towards the smaller base side 8b. The side 8c coincides with the side 6d.

Two minor side faces 9 and 10 depart respectively from the left main side face 7 and from the right main side face 8.

Each minor side face 9, 10 has the same shape, i.e. a trapezoidal shape.

Their extension is towards the bottom of the sole and towards each other. This means that the left minor side face 9 is oriented towards the right minor side face 10 and vice versa.

Each minor side face 9, 10, has respectively base sides 9a, 9b, 10a, 10b parallel one with respect to the other with the top base sides 9b, 10b (suitable to be in contact with the ground) smaller than the bottom base sides 9a, 10a (attached to the lower surface 20 of the sole). The base sides 9a, 9b are connected by two sides 9c (left), 9d (right) of the same size and opposite inclination, i.e. they are inclined towards the smaller base side 9b. The side 7c coincides with the side 9c.

The base sides 10a, 10b are connected by two sides 10c (left), 10d (right) of the same size and opposite inclination, i.e. they are inclined towards the smaller base side 10b. The side 10d coincides with the side 8d.

At the end, to close or encircle the shape of the lug being disclosed, the sidewall 4 comprises two inner faces 11, 12.

The inner faces 11, 12 depart respectively from the left minor side face 9 and from the right minor side face 10. The inner faces 11, 12 are centrally connected the one with the other.

Each inner face 11, 12 has the same shape, i.e. a trapezoidal shape.

Their extension is towards the front of the sole and towards each other. This means that the left inner face 11 is oriented towards the right inner face 12 and vice versa.

Each inner face 11, 12, has respectively bases 11a, 11b, 12a, 12b parallel one with respect to the other with the top bases 11b, 12b (suitable to be in contact with the ground) smaller than the bottom bases 11a, 12a (attached to the lower surface 20 of the sole). The bases 11a, 11b are connected by one side 11c (left, coinciding with the side 9d) and one common side 13 of the same size and opposite inclination, i.e., they are inclined towards the smaller base 11b.

The bases 12a, 12b are connected by one right side 12d (right, coinciding with the side 10c) and the common side 13 of the same size and opposite inclination, i.e. they are inclined towards the smaller base 12b.

The sides 6b, 7b, 8b, 9b, 10b, 11b and 12b are connected by the first base 2 of the lug 1.

Figure 13:
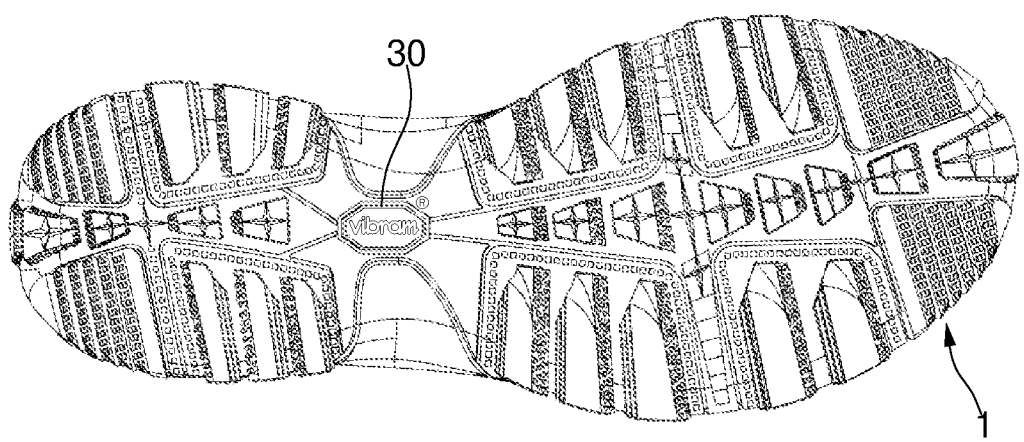
FIGS. 13 and 14 show a bottom view and a lateral view of an example of the present invention.
Figure 14:
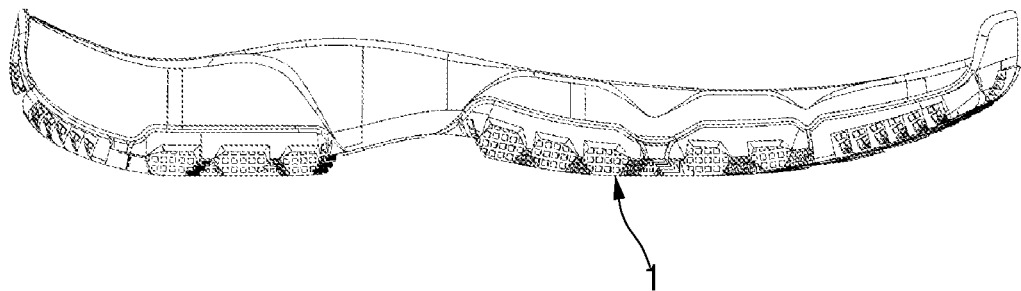
Figure 15:
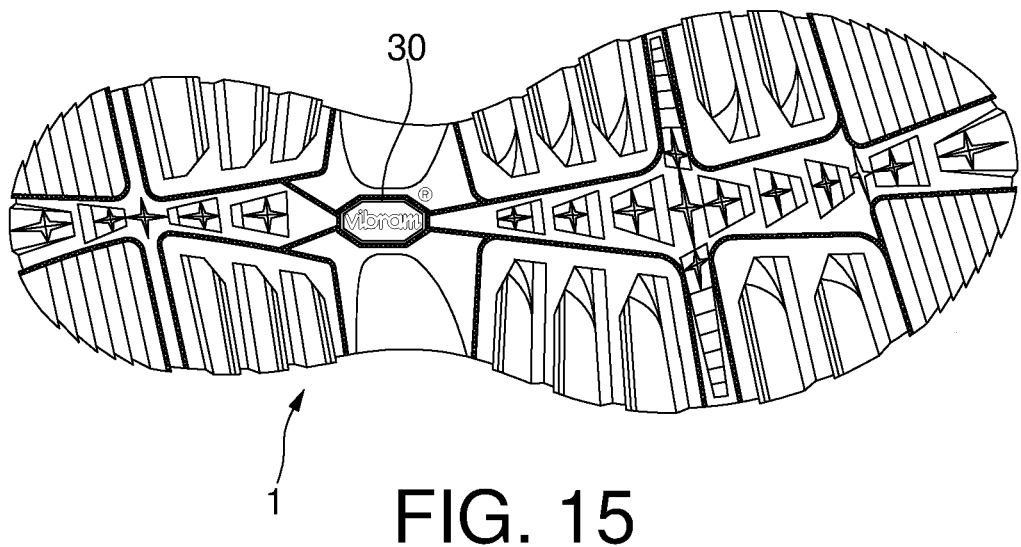
FIG. 15 shows another example of the present invention.

Obviously, the lug 1 can have different shapes and/or orientations, without departing from the scope of attached claims, as for example shown in FIGS. 13-15.

The sidewall 4, 40 can be composed by front face 6, main side faces 7 and 8, minor faces 9, 10 and by inner faces 11 and 12.

Furthermore, with the overall shape of lug 1, 1a, already disclose, the sidewall 4, 40 can be stepwise with steps 4a and/or with the lateral features or elements of the present invention.

Figure 9A:
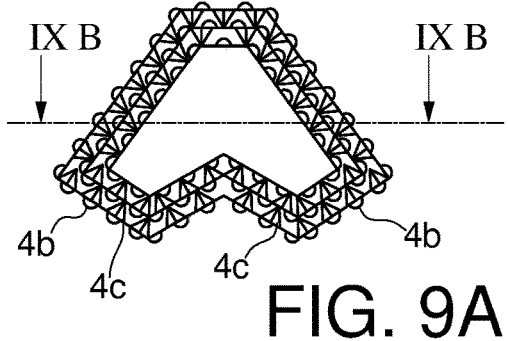
FIGS. 9A-9C show in top plan view another version of a lug for a sole or outsole of footwear according to the present invention, together with its transversal and longitudinal sections (the longitudinal direction goes from toes to heel of a respective sole or outsole while the transversal direction goes from side to side)
Figure 8B:
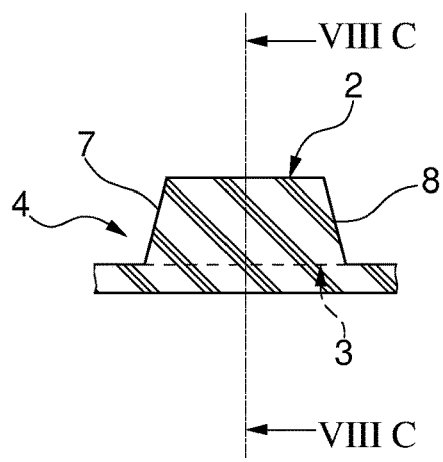
Figure 9B:
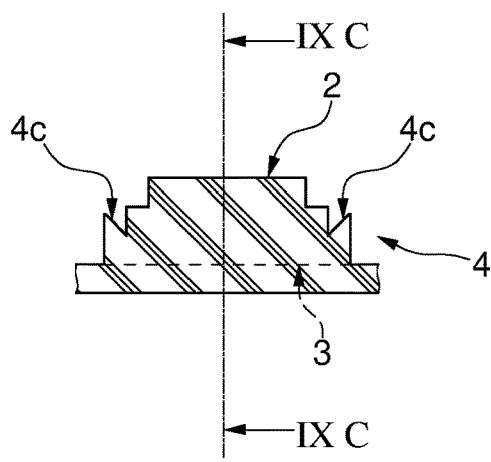
Figure 8C:
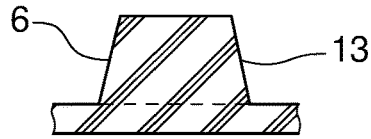
Figure 9C:
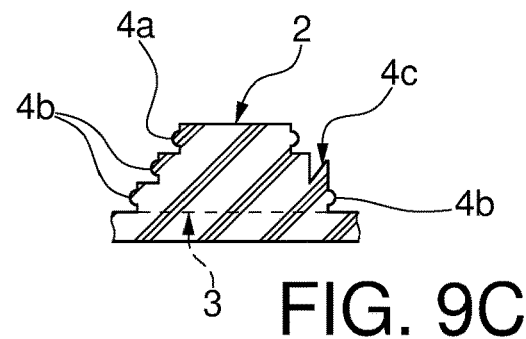
Figure 8D:
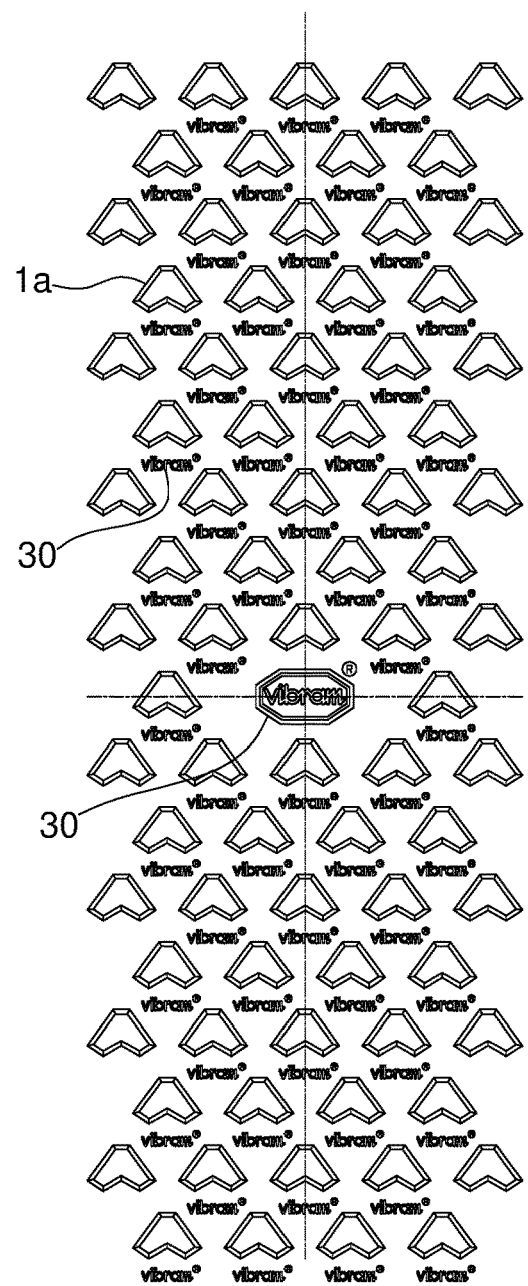
FIGS. 8D, 9D show the pattern of a sole or outsole equipped respectively with a plurality of lugs of FIG. 1 or 9A-9C.

For example, as shown in FIGS. 9A-9C, such configuration of the lug 1 comprises both indentations 4c and protrusions 4b, having features disclosed above. This specific version shows better result in terms of traction or grip.

If steps 4a are present, it is possible to alternate protrusions 4b on one step 4a and indentations 4c in another step 4a. Otherwise, protrusions 4b and indentations 4c may be present also in the same step 4a.

The protrusions 4b and/or the indentations 4c constitute the lateral features or elements characterizing the present invention.

The present invention also refers to a sole equipped with a plurality of lugs 1, having the above-disclosed features.

In this way, it is seen that thanks to the present invention it is possible to obtain (small) faceting and/or features and/or elements in the sidewall 4 of the lug 1, thus obtaining a better traction and/or grip when compared with traditional lugs (such as the one of FIG. 1 or 2A). In fact, the presence of such features and/or elements increases significantly the surface are of the sidewall 4 (when compared to a smooth traditional lug 1a) thus giving a better traction.

The features and/or elements are three-dimensional structures which are placed or obtained at least at the sidewall 4 of the lug 1.

The features and/or elements can have any suitable geometrical solid shape, projecting from or creating corresponding voids in the lug structure.

The faces of the features and/or elements ca be, for example, in the shape of a hexagon, circle, a more complex shape, square or rectangle, an oval shape, quadrangular or triangular.

Furthermore, such lugs 1 are obtained in a single moulding step and, at least in one version of the invention, they are obtained in a single piece with the sole and/or its lower surface 20. This means that such lugs are realized at the same time with the sole and directly attached to the sole (or better to the lower surface 20 thereof).

Figure 9D:
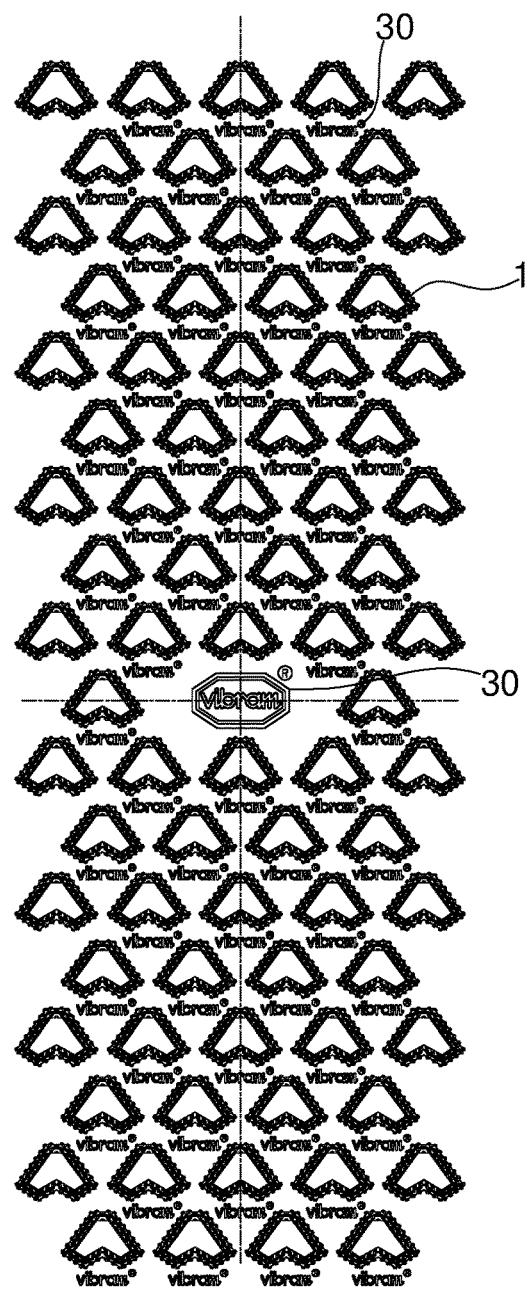

Furthermore, the present invention refers also to a method for obtaining a mold, with which it is possible to mould the sole and/or lugs of the present invention. In particular, first of all it is possible to determine (for example by the creation of a digital file) the bidimensional (2D) structure or pattern desired for a specific sole and/or lug (see for example FIG. 9D).

The 2D structure or pattern can comprise, if desired, also the position and shape of at least one logo and/or trademark, as those indicated with reference 30.

Figure 10:
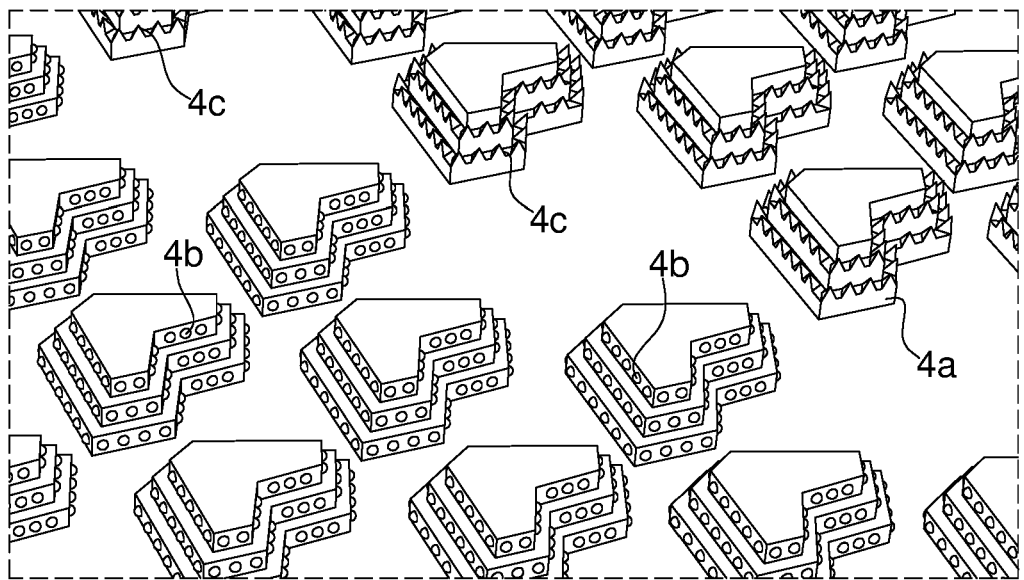
FIGS. 10, 11 and 12 illustrate various possible steps pf production of a mold for obtaining the sole and/or the at least one lug of the present invention.
Figure 11:
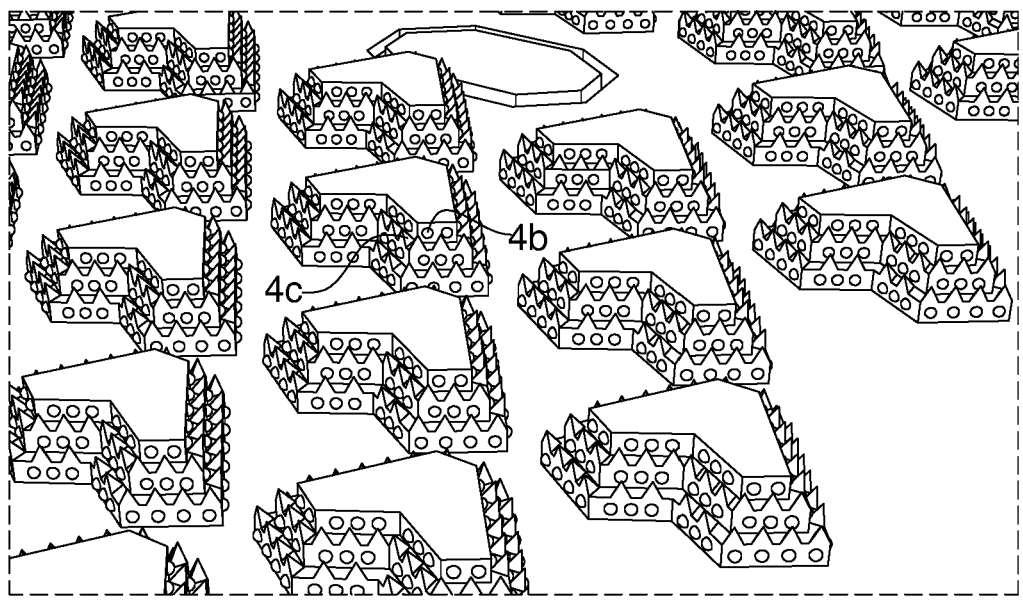
Figure 12:
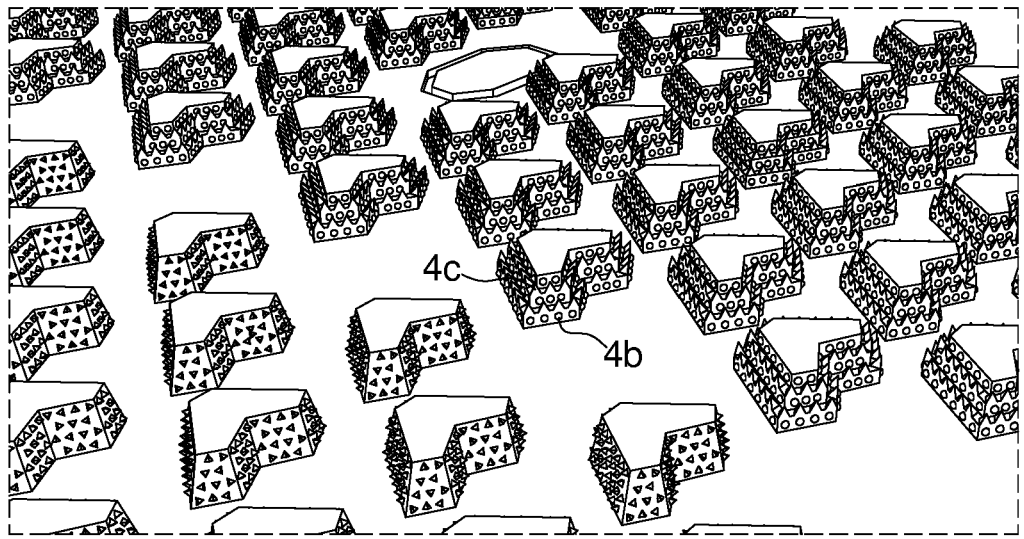

After that, a corresponding three-dimensional 3D digital file is created, as shown in FIGS. 10, 11 and 12. Such 3D file shown the amount of space occupied by the at least one lug 1, comprising its shape and sidewall 4, together with possible steps 4a, protrusions 4b and/or indentations 4c. As shown in such figures, the protrusions 4b can have also a pyramidal shape.

After that, using 3D printed models it is possible to obtain a mold (for example a metallic mold) for the sole and/or lugs of the present invention. The process for printing casting molds, as said, begins with a digital file, going then through solidification, printing and finally casting, the metallic mold.

After the printing step, it follows a step of cleaning parts (not interested by the final shape of the solidified sand model). Obviously, the solidified 3D printed model has a complementary shape with respect to that of the mold, which in turn will have a complementary shape with respect to the sole and/or the lugs.

After the cleaning step, it follows a step of casting pouring the material, for example a molten metal, for the mold and the parts of the solidified 3D printed model are removed after the solidification of the molten metal. The mold is cleaned, and it is ready for being used for obtaining the sole and/or the lugs.

The printing step can be performed by 3D printing by a 3D laser printing machine, as a not-limiting example of the invention.

Such sole and/or lugs, in at least one version of the invention, are obtained by pouring on the mold a material suitable for obtaining a sole and/or a lug, i.e. an elastomeric or a plastic or polymeric or rubber material, possibly comprising further components in order to still further improve the features of the sole and/or of the lug and solidify such material in order to obtain the sole and/or the lugs 1. In particular, by using the 3D printed models it is possible to obtain the features and/or elements (that are undercuts and/or protrusions of small size on the sides and/or top base of the lug) on the sides of the lug 1, which give an improved traction or grip to the sole itself.

EXAMPLES OF THE PRESENT INVENTION

Below is an example showing the increase in surface area of the sides of the lug 1 considering its several versions:

Original side wall area/lug=274 mm$^2$ (FIG. 1);

Stepwise side wall area/lug=455 mm$^2$ (FIG. 2A);

Features side wall area/lug=637 mm$^2$ (FIG. 9A). In this case, it is possible to obtain a 57% increase in the side wall area/lug, varying the patters of its sidewall 4.

Spherical side wall area/lug=about 63 mm$^2$;

Triangular and/or pyramidal or frustum of pyramid side wall area/lug=about 119 mm$^2$.

Obviously the above numbers depend on lug design, geometry, lug size, sidewall features, feature frequency and scale.

For example, the spherical side wall area refers to the surface area contributed by all the hemispheres on one of the lugs of FIG. 9A. The triangular side wall area is the surface area measurement of all the spike features or indentations on FIG. 9 A.

In the present specification the word "lug" means any projection from the sole of a shoe or boot to improve traction or grip strength with the ground.

According to one version of the invention, the sole and the at least one lug 1 have an overall thickness of 0.8 cm to 1.2 cm. The thickness of the sole can be of 2 to 4 mm.

The lug 1 protrudes from the lower surface 20 of the sole of a height of 0.4 to 1.0 cm, in particular of 0.6 cm.

The overall width of one lug 1 can be comprised between 1.2 and 2.0 cm, in particular it is 1.4 or 1.5 cm.

The horizontal size of the at least one step 4a can be 1.0 to 1.3 mm; the vertical size of the at least one step 4a can be 1.0 to 2.0 mm.

The size of the at least one protrusion 4b, i.e. the measure of how much it protrudes, can be 0.4 to 0.8 mm.

The size of the at least one indentation 4c, i.e. the measure of how much it penetrates inside the lug. Can be 0.4 to 2.0 mm.

The difference between the fist base 2 and the second base 3 of the lug 1 can be 1.0 to 2.0 mm each side, in particular 1.5 mm each side.

Obviously, different dimensions or sizes are possible, without departing from the scope of the invention.

It is thus seen that the sole and/or lugs according to the present invention determine an effective solution to the need of producing a sole for footwear, or in particular an outsole, able to respond to the above needs, while allowing an improved traction during the performance of athletic activity, for example walking, running or others, for which they are foreseen.

The invention described above is susceptible to numerous modifications and variations within the protection of the following claims.

The invention claimed is:

1. A lug for a sole or outsole of a footwear, including a shoe, a sport shoe or a work footwear or a boot, wherein said lug comprises:
   a first base, a second base and a sidewall, wherein said first base contacts the ground during use, said second base is suitable to be attached to the sole or outsole and/or it is opposite to said first base and said sidewall connects laterally said first base and said second base, wherein said sidewall comprises at least one step, each of said at least one step having an outer surface defining a perimeter, wherein said lug comprises elements which are three-dimensional structures placed at least at said sidewall able to confer to said lug traction and grip on grounds or terrains consisting of granular particulates or penetrable surfaces, wherein said elements increase the surface area of said sidewall and comprise at least one protrusion and at least one indentation, wherein both of said at least one protrusion and said at least one indentation are disposed together in an alternating manner along said perimeter of at least one same step,
   wherein said at least one protrusion comprises a protruding shape and a base, wherein said base is attached to said sidewall and/or to said step and said protruding shape is a substantially semispherical shape or a faceted semi-sphere shape.

2. The lug according to claim 1, wherein said elements are present at said first base of said lug and increase the surface area of said first base.

3. The lug according to claim 1, wherein said lug has a V-like shape in top plan view and said first base and said second base have a V-like shape in top plan view or wherein said lug has a substantially prismatic, cubic, parallelepiped, frustum of cone or frustum of pyramid, regular, irregular, L-like, C-like shape and said first base and second base have a square, rectangular, polygonal, parallelogram, regular, irregular, L-like, C-like shape, cylindrical, organic, hemispherical, tetrahedral, semi-ellipsoidal, or trapezoidal shape.

4. The lug according to claim 1, wherein said first base is smaller in size than said second base and said sidewall is inclined and/or tapered in use towards a common point of the ground and/or wherein said sidewall comprises faces inclined in use towards a common point of the ground and/or wherein said first base is parallel or not parallel with respect to said second base.

5. The lug according to claim 1, wherein said first base and said second base have the same size, but they are offset one with respect to the other and said sidewall is inclined in use towards the ground along a same direction and/or wherein said sidewall comprises faces inclined in use towards the ground along a same direction.

6. The lug according to claim 1, wherein said sidewall comprises at least two steps, wherein each of said steps are of substantially the same size and comprise at least one of sharp edges, rounded edges or right-angled edges.

7. The lug according to claim 1, wherein said at least one indentation comprises an intruding shape and a base, wherein said base is placed at said sidewall and/or at said step and said intruding shape is a substantially semispherical shape or a faceted semi-sphere, or pyramidal, frustum of pyramid, frustum of cone, conical, spike, diamond or prismatic shape, a parallelepiped or rectangular prism and/or with a square, rectangular, polygonal, parallelogram, regular, irregular, L-like, C-like shape, cylindrical, organic, hemispherical, tetrahedral, semi-ellipsoidal, or trapezoidal base.

8. A sole for a footwear, including an outsole of a shoe, a sport shoe or a work footwear or a boot, wherein said sole comprises an upper surface, adapted in use to face toward the foot of a user, and a lower surface, adapted in use to face toward the resting surface or the ground, wherein said lower surface comprises at least one and/or a plurality of lugs according to claim 1.

9. The sole according to claim 8, wherein said lower surface is directly attached by means of a molding step with said at least one lug and/or said plurality of lugs, at said second base of said lug.

10. The sole according to claim 8, wherein said sole has a thickness, wherein said thickness is smaller at a part in use in the front of the sole and said thickness is greater at a part in use in the rear of the sole and/or wherein said lugs have a height, wherein said height is variable along said sole, wherein said height is smaller at a part in use in the front of the sole while it is greater at a part in use in the rear of the sole.

11. The sole according to claim 8, wherein said lower surface comprises at least one protrusion and/or at least one indentation.

12. A lug for a sole or outsole of a footwear, including a shoe, a sport shoe or a work footwear or a boot, wherein said lug comprises:

a first base, a second base and a sidewall, wherein said first base contacts the ground during use, said second base is suitable to be attached to the sole or outsole and/or it is opposite to said first base and said sidewall connects laterally said first base and said second base, wherein said sidewall comprises at least one step a plurality of steps, each of said at least one step plurality of steps having an outer surface defining a different perimeter, wherein said lug comprises elements which are three-dimensional structures placed at least at at least two adjoining steps of the plurality of steps of said sidewall to confer to said lug traction and grip on grounds or terrains consisting of granular particulates or penetrable surfaces, wherein said elements increase the surface area of said sidewall and comprise at least one protrusion and at least one indentation, wherein both of said at least one protrusion and said at least one indentation are disposed together in an alternating manner along each different perimeter of at least two adjoining steps of the plurality of steps, wherein said at least one protrusion comprises a protruding shape and a base, wherein said base is attached to said sidewall and/or to said step and said protruding shape is a substantially semispherical shape or a faceted semi-sphere shape.

* * * * *